United States Patent
Ko et al.

(10) Patent No.: US 12,439,473 B2
(45) Date of Patent: Oct. 7, 2025

(54) METHOD AND DEVICE FOR CHANNEL SENSING AND RESOURCE ALLOCATION FOR SL DRX

(71) Applicant: LG ELECTRONICS INC., Seoul (KR)

(72) Inventors: Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 378 days.

(21) Appl. No.: 18/246,752

(22) PCT Filed: Sep. 27, 2021

(86) PCT No.: PCT/KR2021/013147
§ 371 (c)(1),
(2) Date: Mar. 27, 2023

(87) PCT Pub. No.: WO2022/065956
PCT Pub. Date: Mar. 31, 2022

(65) Prior Publication Data
US 2023/0389121 A1    Nov. 30, 2023

(30) Foreign Application Priority Data

Sep. 25, 2020 (KR) .................. 10-2020-0124421

(51) Int. Cl.
*H04W 4/00* (2018.01)
*H04W 72/0446* (2023.01)
(Continued)

(52) U.S. Cl.
CPC ....... *H04W 76/28* (2018.02); *H04W 72/0446* (2013.01); *H04W 72/25* (2023.01)

(58) Field of Classification Search
CPC .. H04W 76/28; H04W 72/25; H04W 72/0446
(Continued)

(56) References Cited

U.S. PATENT DOCUMENTS

2020/0220694 A1*  7/2020  Khoryaev ............. H04W 28/04
2020/0266857 A1*  8/2020  Hwang ................ H04L 1/1864
2020/0288435 A1   9/2020  Kwak et al.

OTHER PUBLICATIONS

European Patent Office Application Serial No. 21872984.6, Search Report dated Sep. 18, 2024, 15 pages.
(Continued)

*Primary Examiner* — Temica M Beamer
(74) *Attorney, Agent, or Firm* — LEE, HONG, DEGERMAN, KANG & WAIMEY

(57) ABSTRACT

Proposed is an operation method of a first device (100) in a wireless communication system. The method may comprise the steps of: determining a sensing window associated with data to be transmitted; determining a selection window associated with the data to be transmitted; on the basis of sensing carried out within the sensing window, selecting a sidelink (SL) resource, within the selection window and a first active time determined on the basis of a SL discontinuous reception (DRX) configuration; on the basis of the SL resource, transmitting first sidelink control information (SCI), for scheduling a physical sidelink shared channel (PSSCH), to a second device (200) through a physical sidelink control channel (PSCCH); and, on the basis of the SL resource, transmitting second SCI and the data to the second device (200) through the PSSCH.

15 Claims, 21 Drawing Sheets

(51) Int. Cl.
    *H04W 72/25*    (2023.01)
    *H04W 76/28*    (2018.01)
(58) Field of Classification Search
    USPC .......................................................... 370/329
    See application file for complete search history.

(56) References Cited

OTHER PUBLICATIONS

Lenovo et al., "Sidelink resource allocation for Power saving," 3GPP TSG RAN WG1 #102-e, R1-2005839, Aug. 2020, 7 pages.
Oppo, "Power saving mechanisms for NR SL," 3GPP TSG RAN WG1 #102-e, R1-2006009, Aug. 2020, 5 pages.
LG Electronics, "Summary of RAN1 Agreements/Working assumptions in WI 5G V2X with NR sidelink," 3GPP TSG RAN WG1 #99, R1-1913601, Nov. 2019, 40 pages.

\* cited by examiner

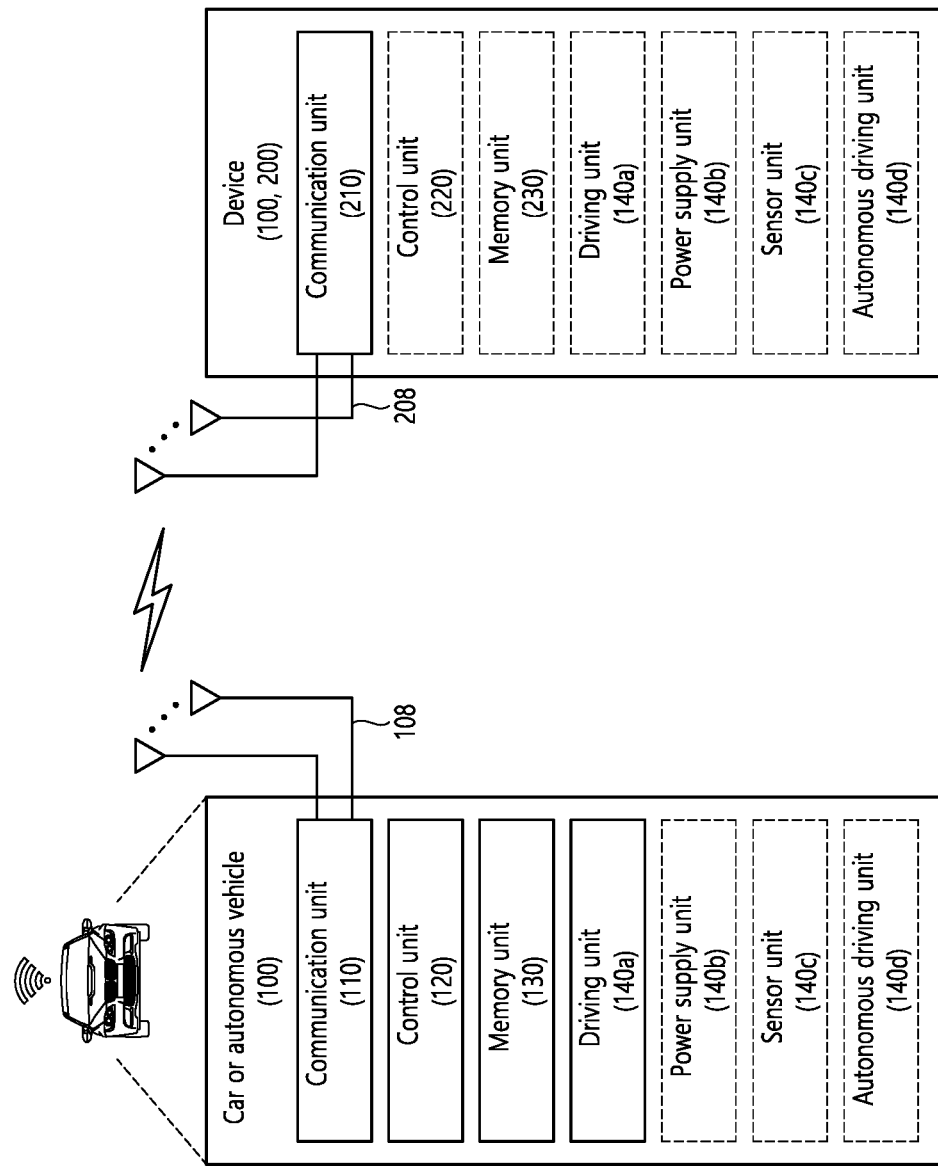

METHOD AND DEVICE FOR CHANNEL SENSING AND RESOURCE ALLOCATION FOR SL DRX

CROSS-REFERENCE TO RELATED APPLICATIONS

This application is the National Stage filing under 35 U.S.C. 371 of International Application No. PCT/KR2021/013147, filed on Sep. 27, 2021, which claims the benefit of earlier filing date and right of priority to Korean Application No. 10-2020-0124421, filed on Sep. 25, 2020, the contents of which are all incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

According to an embodiment, an operation method of a first device 100 in wireless communication system is proposed. The method may comprise: determining a sensing window related to data to be transmitted; determining a selection window related to the data to be transmitted; selecting a sidelink (SL) resource within a first active time determined based on an SL discontinuous reception (DRX) configuration and the selection window, based on sensing performed within the sensing window; transmitting, to a second device 200, first sidelink control information (SCI) for scheduling of a physical sidelink shard channel (PSSCH) through a physical sidelink control channel (PSCCH), based on the SL resource; and transmitting, to the second device 200, second SCI and the data through the PSSCH, based on the SL resource.

The user equipment (UE) can efficiently perform SL communication.

BRIEF DESCRIPTION OF THE DRAWINGS

FIG. 21 shows a vehicle or an autonomous vehicle, based on an embodiment of the present disclosure.

DETAILED DESCRIPTION

Figure 1:
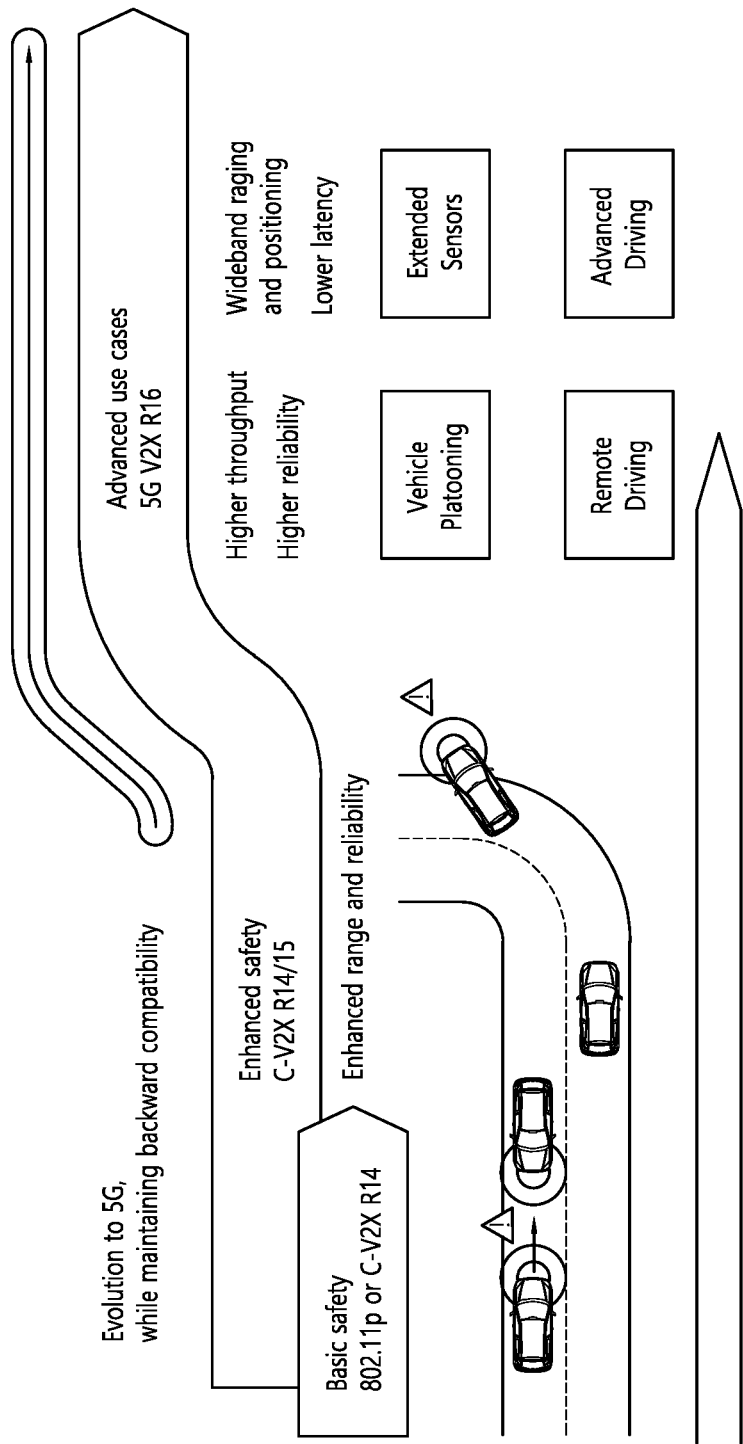
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
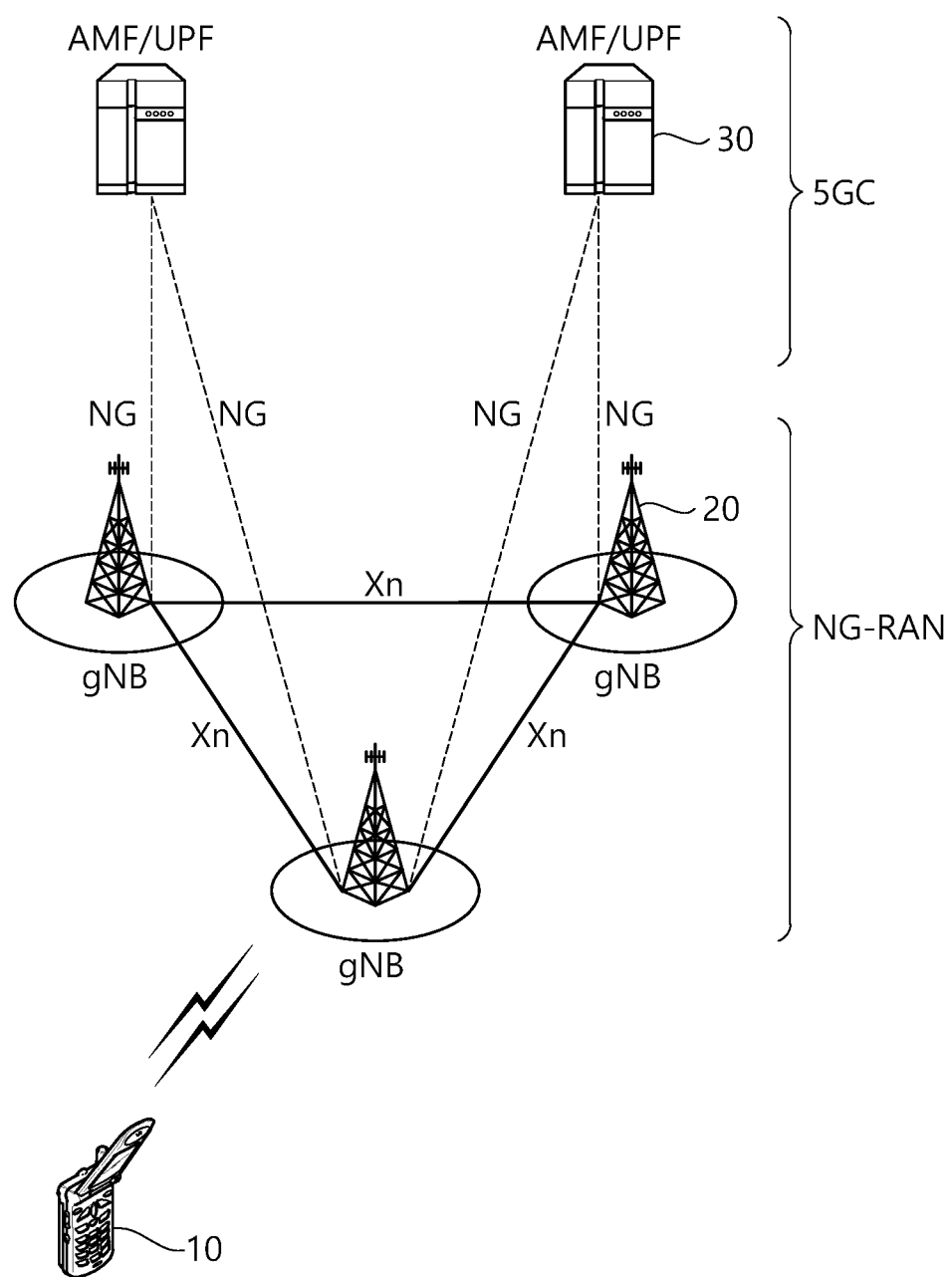
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
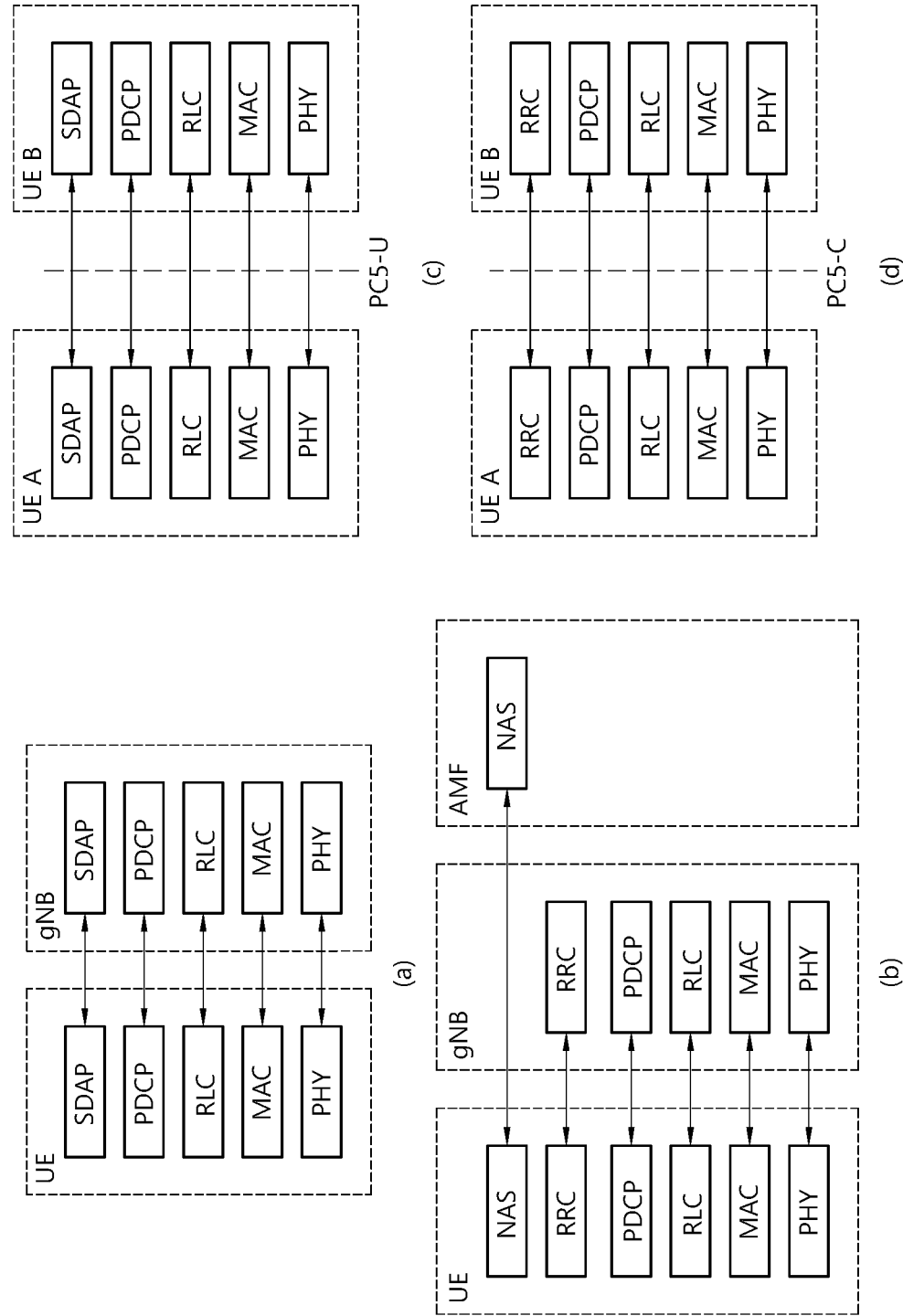
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
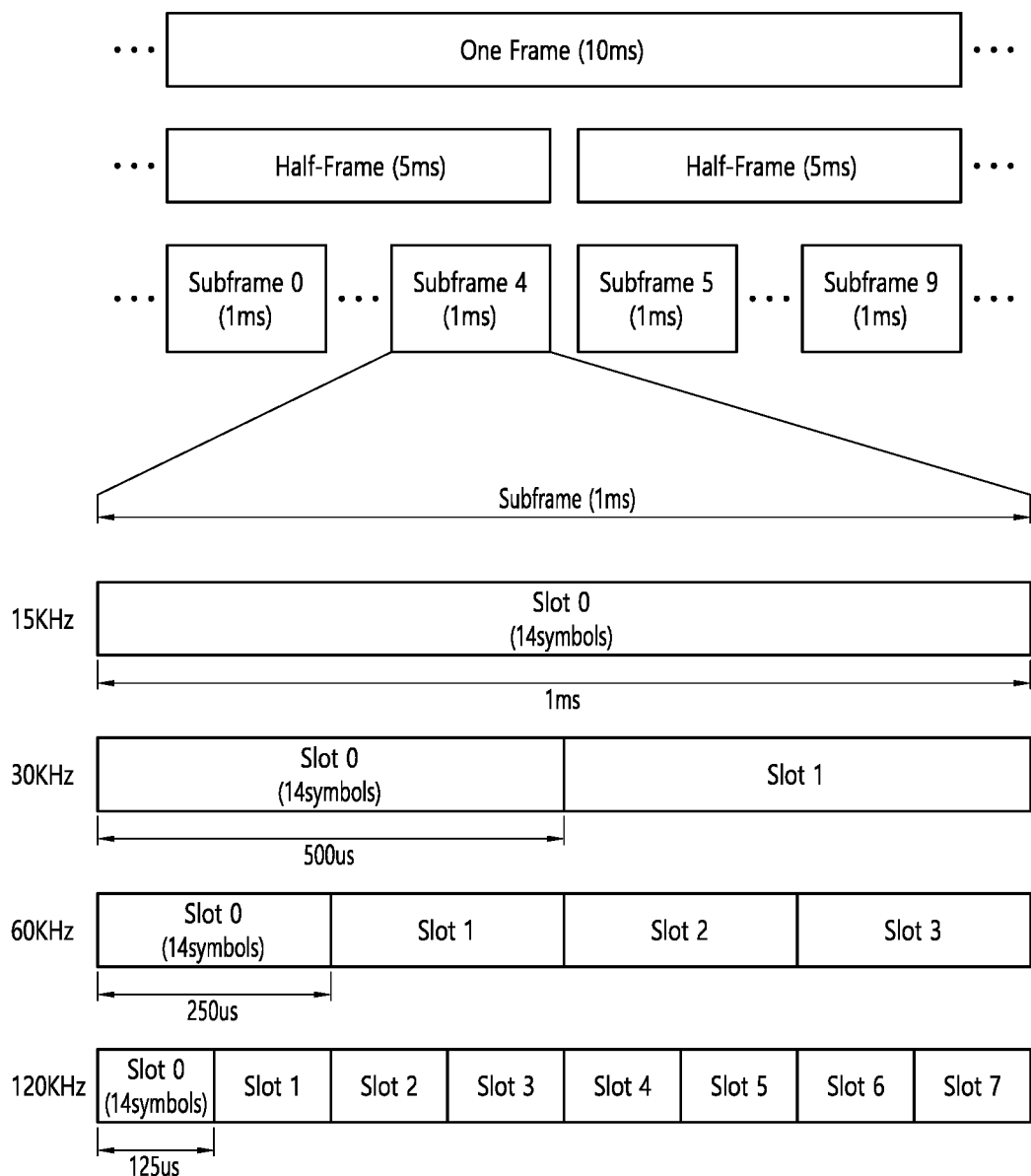
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symbol}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHZ | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHZ | 60, 120, 240 kHz |

Figure 5:
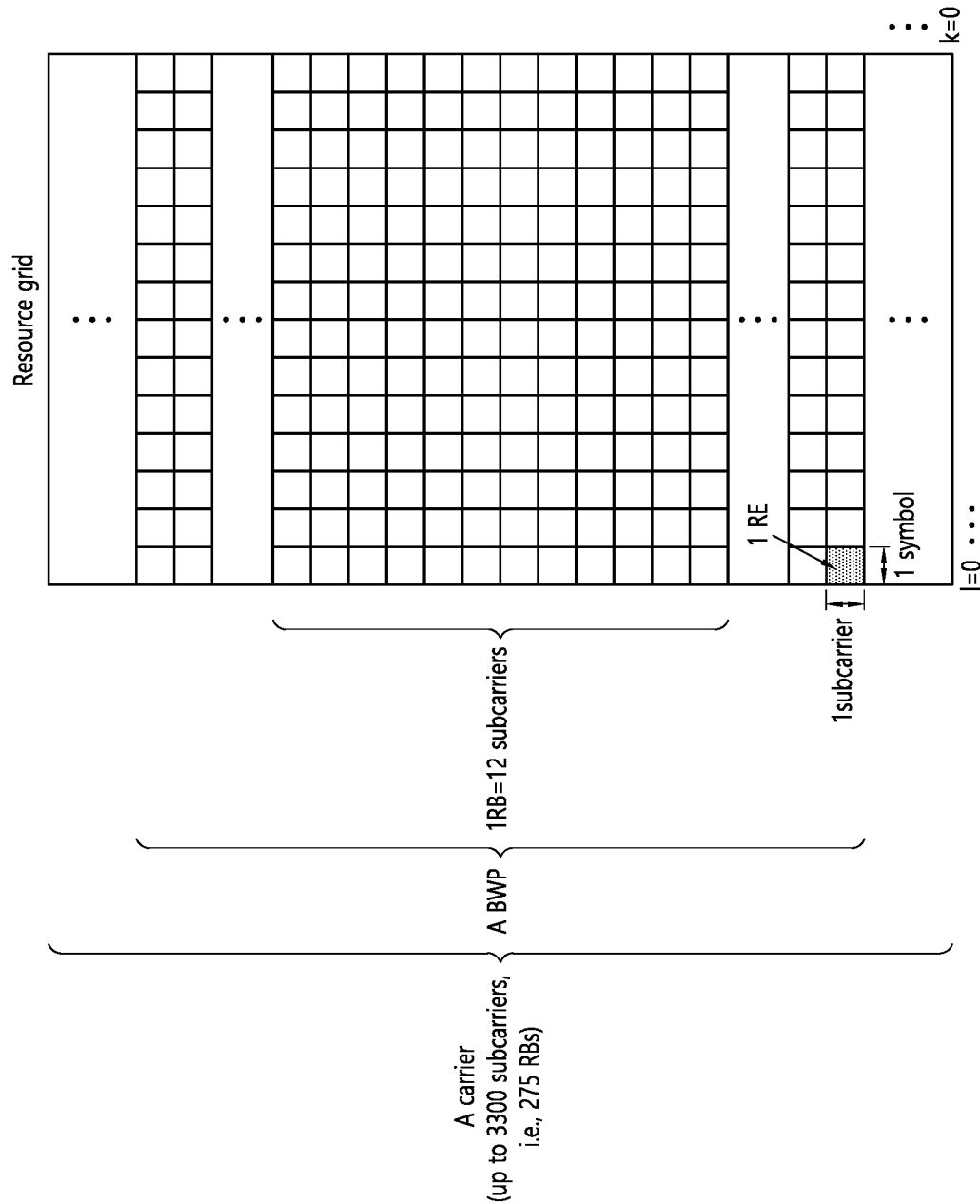
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE_UE. For the UE in the RRC_CONNECTED mode, at least one SL BWP may be activated in the carrier.

Figure 6:
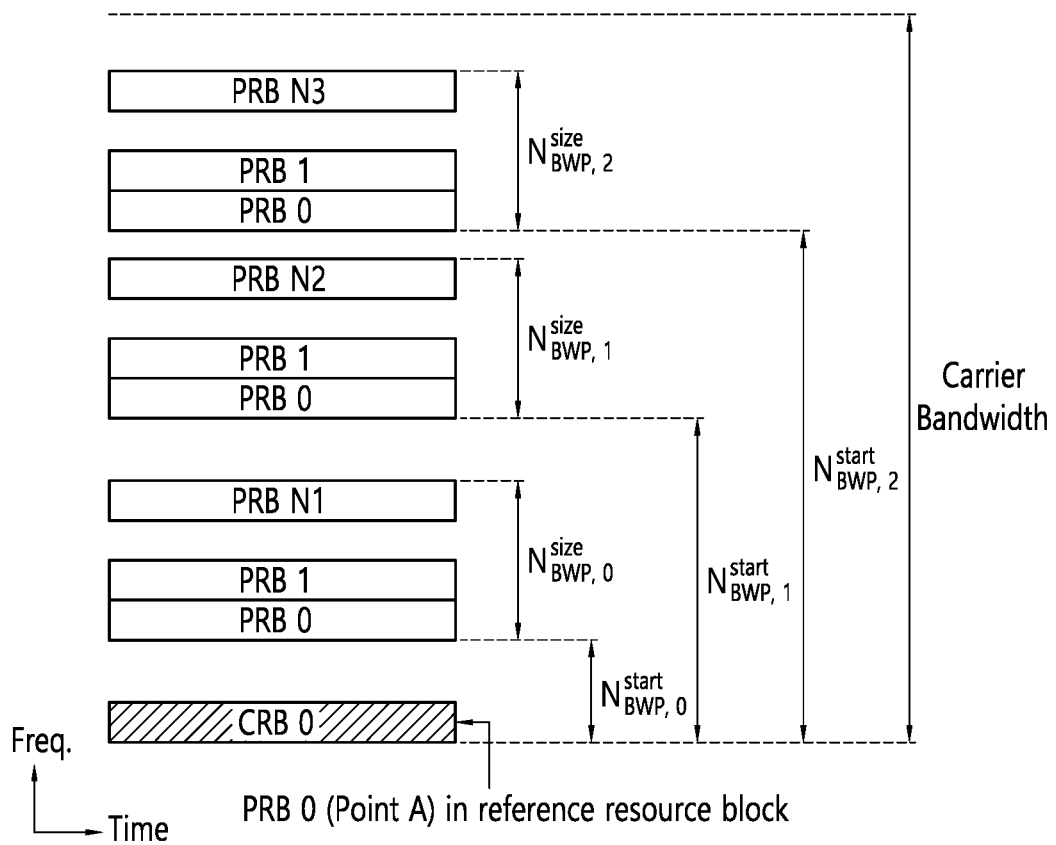
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
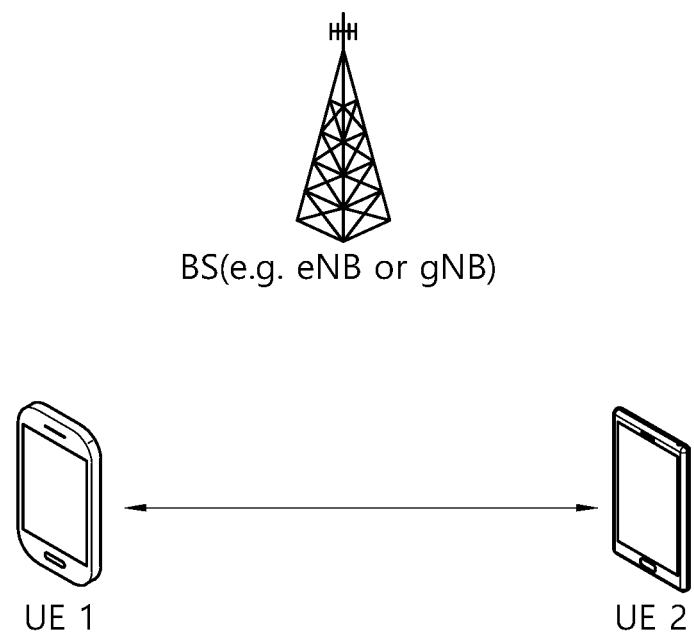
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
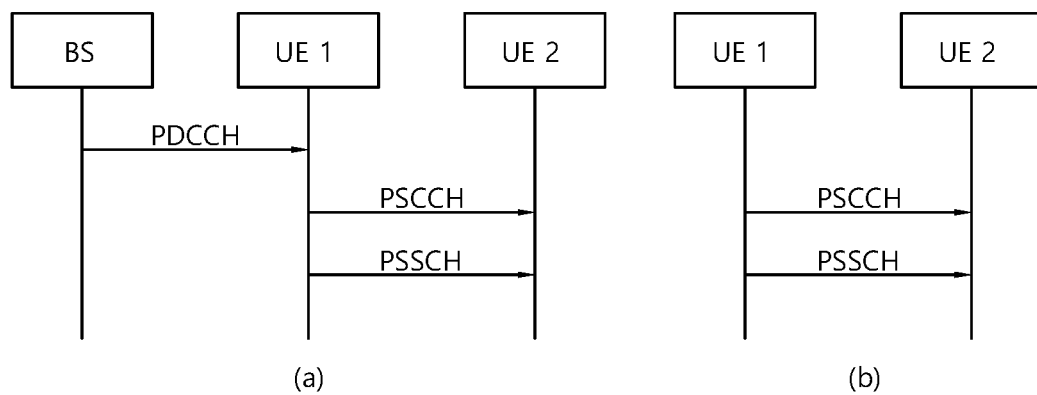
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

For example, a UE may help select an SL resource for another UE. For example, in NR resource allocation mode 2, a UE may receive a configured grant for an SL transmission. For example, in NR resource allocation mode 2, a UE may schedule SL transmission of another UE. For example, in NR resource allocation mode 2, a UE may reserve SL resources for blind retransmission.

For example, in NR resource allocation mode 2, UE 1 may indicate the priority of SL transmission to a second UE using SCI. For example, a second UE may decode the SCI, and the second UE may perform sensing and/or resource (re)selection based on the priority. For example, the resource (re)selection procedure may include identifying a candidate resource in a resource selection window by a second UE and selecting a resource for (re)transmission from among the identified candidate resources. For example, the resource selection window may be a time interval in which a UE selects a resource for SL transmission. For example, after the second UE triggers resource (re)selection, a resource selection window may start at T1≥0, and the resource selection window may be limited by a remaining packet delay budget of a second UE. For example, in the step of identifying a candidate resource in a resource selection window by a second UE, when a specific resource is indicated by SCI received by the second UE from a first UE and the L1 SL RSRP measurement value for the specific resource exceeds an SL RSRP threshold, the second UE may not determine the specific resource as a candidate resource. For example, the SL RSRP threshold may be determined based on the priority of SL transmission indicated by SCI received by a second UE from a first UE and the priority of SL transmission on a resource selected by the second UE.

For example, the L1 SL RSRP may be measured based on SL Demodulation Reference Signal (DMRS). For example, one or more PSSCH DMRS patterns may be configured or previously configured in the time domain for each resource pool. For example, PDSCH DMRS configuration type 1 and/or type 2 may be identical to or similar to the frequency domain pattern of PSSCH DMRS. For example, an exact DMRS pattern may be indicated by SCI. For example, in NR resource allocation mode 2, a transmitting UE may select a specific DMRS pattern from DMRS patterns configured or previously configured for a resource pool.

For example, in NR resource allocation mode 2, based on sensing and resource (re)selection procedures, a transmitting UE may perform initial transmission of a Transport Block (TB) without reservation. For example, based on sensing and resource (re)selection procedure, a transmitting UE may reserve SL resources for initial transmission of a second TB using SCI related to a first TB.

For example, in NR resource allocation mode 2, a UE may reserve a resource for feedback-based PSSCH retransmission through signaling related to previous transmission of the same transport block (TB). For example, the maximum number of SL resources reserved by one transmission including the current transmission may be 2, 3 or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, if there is no configuration or pre-configuration, the maximum number of HARQ (re)transmissions may have not been specified. For example, the configuration or pre-configuration may be for a transmission UE. For example, in NR resource allocation mode 2, HARQ feedback for releasing resources not used by a UE may be supported.

For example, in NR resource allocation mode 2, a UE may indicate one or more subchannels and/or slots used by the UE to other UEs using SCI. For example, a UE may indicate to another UE one or more subchannels and/or slots reserved by the UE for PSSCH (re)transmission using SCI. For example, a minimum allocation unit of SL resources may be a slot. For example, the size of a subchannel may be configured or pre-configured for a UE.

Figure 9:
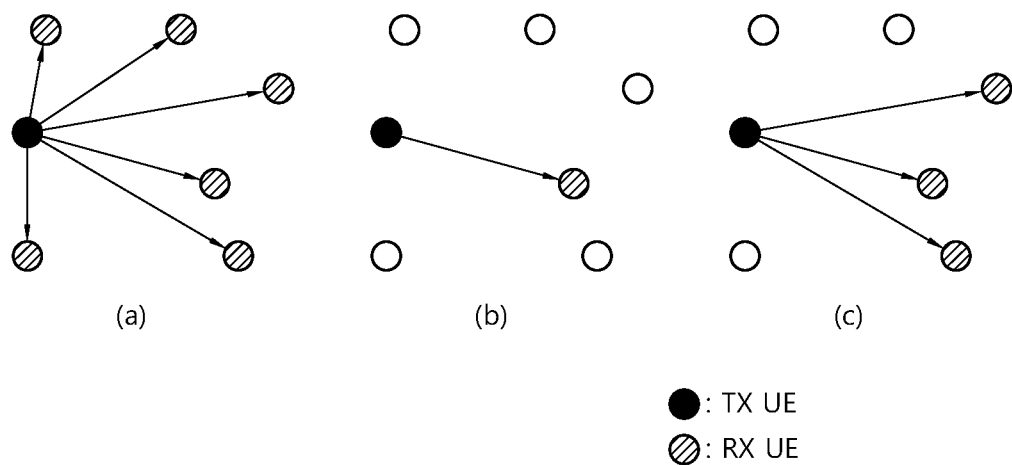
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since a transmitting UE may transmit at least one of a SCI, a first SCI, and/or a second SCI to a receiving UE through a PSCCH, the PSCCH may be replaced/substituted with at least one of the SCI, the first SCI and/or the second SCI. Additionally/alternatively, for example, the SCI may be replaced/substituted with at least one of the PSCCH, the first SCI, and/or the second SCI. Additionally/alternatively, for example, since a transmitting UE may transmit a second SCI to a receiving UE through a PSSCH, the PSSCH may be replaced/substituted with the second SCI.

Hereinafter, power saving will be described.

As a power saving technique of at UE, UE adaptation to traffic and power consumption characteristics, adaptation according to frequency/time change, adaptation to antenna, adaptation to discontinuous reception (DRX) configuration, adaptation to UE processing capability, adaptation for reduction of PDCCH monitoring/decoding, power saving signal/channel/procedure for triggering adaptation to UE power consumption, power consumption reduction in RRM measurement, etc. may be considered.

Hereinafter, discontinuous reception (DRX), which is one of techniques capable of realizing UE power saving, will be described.

The procedure of a DRX-related UE can be summarized as shown in Table 5 below.

TABLE 5

| | Type of signals | UE procedure |
|---|---|---|
| Step 1 | RRC signaling (MAC-CellGroupConfig) | receive DRX configuration information |

TABLE 5-continued

| | Type of signals | UE procedure |
|---|---|---|
| Step 2 | MAC CE((Long) DRX command MAC CE) | receive DRX command |
| Step 3 | | monitor PDCCH during on-duration of DRX period |

Figure 10:
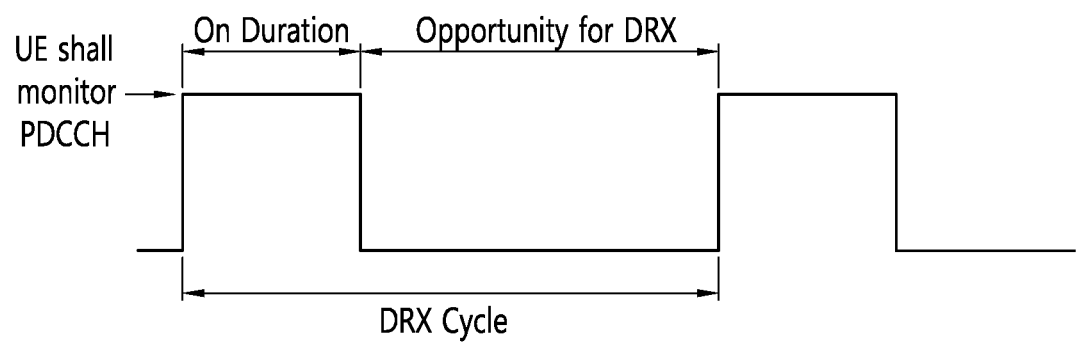
FIG. 10 shows an example of a DRX cycle according to an embodiment of the present disclosure.

FIG. 10 shows an example of a DRX cycle according to an embodiment of the present disclosure. The embodiment of FIG. 10 may be combined with various embodiments of the present disclosure.

Referring to FIG. 10, a UE uses DRX in RRC_IDLE state and RRC_INACTIVE state to reduce power consumption. When DRX is configured, a UE performs DRX operation according to DRX configuration information. A UE operating as DRX repeatedly turns on and off the reception task.

For example, when DRX is configured, a UE attempts to receive a downlink channel PDCCH only within a pre-configured time interval, and does not attempt to receive the PDCCH within the remaining time interval. The time period during which a UE should attempt to receive a PDCCH is called on-duration, and the on-duration period is defined once per DRX cycle.

A UE may receive DRX configuration information from a gNB through RRC signaling, and may operate as DRX through reception of a (long) DRX command MAC CE.

DRX configuration information may be included in MAC-CellGroupConfig. The I.E., MAC-CellGroupConfig, may be used to configure MAC parameters for a cell group, including DRX.

A DRX command MAC CE or long DRX command MAC CE is identified by a MAC PDU subheader with a logical channel ID (LCID). It has a fixed size of 0 bits.

Table 6 below shows a value of LCID for DL-SCH.

TABLE 6

| Index | LCID values |
|---|---|
| 111011 | Long DRX Command |
| 111100 | DRX Command |

The PDCCH monitoring operation of a UE is controlled by DRX and Bandwidth Adaptation (BA). On the other hand, when DRX is configured, a UE does not need to continuously monitor a PDCCH. On the other hand, DRX has the following characteristics.

on-duration: This is a period in which a UE waits to receive the next PDCCH after waking up. If a UE successfully decodes a PDCCH, the UE maintains the awake state and starts an inactivity-timer.

an inactive timer: This is a time interval in which a UE waits for successful PDCCH decoding from the last successful PDCCH decoding, and it is a period in which the UE sleeps again in case of failure. A UE must restart an inactivity timer after a single successful decoding of a PDCCH for the only first transmission (i.e., not for retransmission).

a retransmission timer: A time interval during which a retransmission is expected.

a cycle: It defines the periodic repetition of on-duration and subsequent possible periods of inactivity.

Hereinafter, DRX in a MAC layer will be described. Hereinafter, a MAC entity may be expressed as a UE or a MAC entity of a UE.

A MAC entity may be configured by RRC with DRX function for controlling a PDCCH monitoring activity of a UE for a radio network temporary identifier (C-RNTI), CS-RNTI, TPC-PUCCH-RNTI, TPC-PUSCH-RNTI, and TPC-SRS-RNTI of the MAC entity. When using DRX operation, a MAC entity must monitor a PDCCH. In the RRC_CONNECTED state, if DRX is configured, a MAC entity may monitor a PDCCH discontinuously using a DRX operation. Otherwise, a MAC entity must continuously monitor a PDCCH.

RRC controls DRX operation by configuring parameters of DRX configuration information.

If a DRX cycle is configured, an active time includes the following time.

a running time of drx-onDurationTimer or drx-InactivityTimer or drx-RetransmissionTimerDL or drx-RetransmissionTimerUL or ra-ContentionResolutionTimer; or a time a scheduling request was transmitted on a PUCCH and is pending; or a time when a PDCCH indicating new transmission to a C-RNTI of a MAC entity is not received after successful reception of a random access response to a random access preamble not selected by the MAC entity among contention-based random access preambles.

When DRX is configured, a UE must follow a procedure below.

1> if a MAC PDU is transmitted in a configured uplink grant
2> start the drx-HARQ-RTT-TimerUL for the corresponding HARQ process after the first reception of the corresponding PUSCH transmission;
2> stop the drx-RetransmissionTimerUL for the corresponding HARQ process.
1> if a drx-HARQ-RTT-TimerDL expires:
2> if the data of the corresponding HARQ process was not successfully decoded:
3> start the drx-RetransmissionTimerDL for the corresponding HARQ process.
1> if a drx-HARQ-RTT-TimerUL expires:
2> start the drx-RetransmissionTimerUL for the corresponding HARQ process.
1> if a DRX Command MAC CE or a Long DRX Command MAC CE is received:
2> stop drx-onDurationTimer;
2> stop drx-InactivityTimer.
1> if drx-InactivityTimer expires or a DRX Command MAC CE is received:
2> if the Short DRX cycle is configured:
3> start of restart drx-ShortCycleTimer;
3> use the Short DRX Cycle.
2> else:
3> use the Long DRX cycle.
1> if drx-ShortCycleTimer expires:
2> use the Long DRX cycle.
1> if a Long DRX Command MAC CE is received:
2> stop drx-ShortCycleTimer;
2> use the Long DRX cycle.
1> if the Short DRX Cycle is used, and [(SFN×10)+ subframe number] modulo (drx-ShortCycle)=(drx-StartOffset) modulo (drx-ShortCycle); or
1> if the Long DRX Cycle is used, and [(SFN×10)+ subframe number] modulo (drx-LongCycle)=drx-StartOffset:
2> if drx-SlotOffset is configured:
3> start drx-onDurationTimer after drx-SlotOffset.
2> else:
3> start drx-onDurationTimer.
1> if the MAC entity is in Active Time:
2> monitor the PDCCH;
2> if the PDCCH indicates a DL transmission or if a DL allocation is configured:
3> start the drx-HARQ-RTT-TimerDL for the corresponding HARQ process after the end of the corresponding PUCCH transmission;
3> stop the drx-RetransmissionTimerDL for the corresponding HARQ process.
2> if the PDCCH indicates a UL transmission:
3> start the drx-HARQ-RTT-TimerUL for the corresponding HARQ process after the end of the first reception of the corresponding PUSCH transmission;
3> stop drx-RetransmissionTimerUL for the corresponding HARQ process.
2> if the PDCCH indicates a new transmission (DL or UL):
3> start or restart drx-InactivityTimer.
1> else (That is, when it is not a part of the active time):
2> not transmit type-0-triggered SRS.
1> if CSI masking (csi-Mask) is setup by upper layers:
2> if drx-onDurationTimer is not running:
3> not report CSI on PUCCH.
1> else:
2> if the MAC entity is not in the active time:
3> not report CSI on PUCCH.

Regardless of whether the MAC entity monitors the PDCCH or not, the MAC entity sends HARQ feedback and type-1-triggered SRS when expected.

If it is not a complete PDCCH time point (i.e., if the active time starts or expires in the middle of the PDCCH time point), the MAC entity does not need to monitor a PDCCH.

In this specification, the wording "configuration or definition" may be interpreted as being (pre)configured (via predefined signaling (e.g., SIB, MAC signaling, RRC signaling)) from a base station or network. For example, "A may be configured" may include "(pre)configuring/defining or notifying A of a base station or network for a UE". Alternatively, the wording "configure or define" may be interpreted as being previously configured or defined by the system. For example, "A may be configured" may include "A is configured/predefined by the system".

Meanwhile, in order to reduce power consumption of a UE in SL communication, the UE may not always monitor a transport channel. That is, a UE can detect an SL signal or channel to be received by monitoring a transport channel only when reception of a PSCCH and/or PSSCH is required, and the UE may perform decoding on the SL signal or channel.

On the other hand, a DRX cycle may include (i) an active time during which a UE should monitor a transport channel in awake mode and, if necessary, detect/decode an SL channel and (ii) an inactive time in which a UE is in sleep mode (i.e., a UE does not need to monitor a channel).

For example, the active time may include (i) OnDurationTimer period during which a UE must be awake at the beginning of a DRX cycle, (ii) an InActivityTimer period in which a UE should be additionally awake due to a high possibility of transmission of an additional SL signal or channel by another UE after the OnDurationTimer expires, (iii) RetransmissionTimer period in which a UE must be additionally awake since the possibility of additional retransmission by other UEs is high after a specific transmission, etc.

For example, the inactive time may be all periods except the active time within a DRX cycle representing the entire DRX section. In particular, for example, the inactivity time may include a processing time related to HARQ-based retransmission and an HARQ-RTT-Timer section configured to secure a time required for retransmission.

For example, according to the length of a DRX cycle, a DRX cycle may include (i) a 'DRX long cycle' with a relatively long cycle length and (ii) a 'DRX short cycle' with a relatively short cycle length. For example, the start of a DRX long cycle and a DRX short cycle may be expressed as an offset value relative to the reference timing. Here, for example, the offset value may be StartOffset expressed as the number of subframe units. For example, the offset value may be SlotOffset expressed as the number of slot units.

According to various embodiments of the present disclosure, a method for a UE to perform channel sensing and resource selection based on DRX and a device supporting the same in resource allocation mode 2 are proposed. In the following description, DRX may mean SL DRX.

For example, in resource allocation mode 2, a UE may select an valid resource through channel sensing to determine a transmission resource on a channel. At this time, for maximum power saving gain, since a UE performing SL communication based on SL DRX is in an awake state only during an active time period of a DRX cycle, a UE may not be able to perform a conventional sensing operation. Specifically, for example, a UE performing SL communication based on SL DRX may not be able to perform sensing while sliding a sensing window of about 1 second for all time intervals. In addition, a selection window in which a UE can select/determine transmission resources may also be limited by a DRX cycle.

In order to solve the above problem, a UE performing SL communication based on DRX may perform sensing only during an active time period within a DRX cycle.

Figure 11:
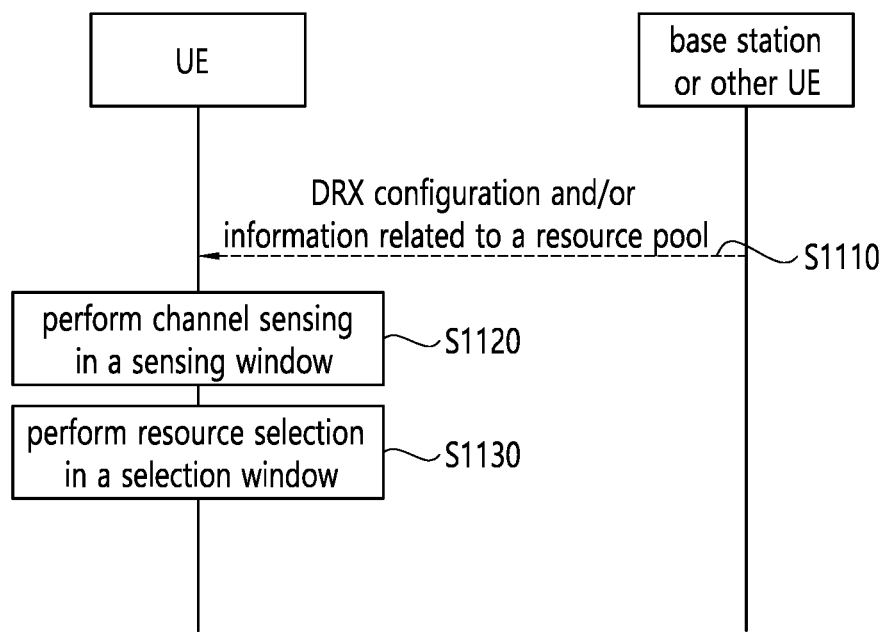
FIG. 11 shows a procedure for a UE to perform channel sensing and resource selection based on DRX according to an embodiment of the present disclosure.

FIG. 11 shows a procedure for a UE to perform channel sensing and resource selection based on DRX according to an embodiment of the present disclosure. The embodiment of FIG. 11 may be combined with various embodiments of the present disclosure.

Referring to FIG. 11, in step S1110, a UE may receive information related to DRX configuration and/or resource pool. For example, a UE may receive information related to DRX configuration and/or resource pool from a base station. For example, a UE may receive information related to DRX configuration and/or a resource pool from another UE. Alternatively, for example, information related to DRX configuration and/or resource pool may be predefined for a UE.

In step S1120, a UE may configure a sensing window within a resource pool and perform sensing within a sensing window. For example, a UE may perform sensing based on DRX configuration according to various embodiments of the present disclosure.

In step S1130, a UE may configure a selection window within a resource pool, and may select a resource within the selection window based on the sensing result. For example, a UE may select a resource within the selection window based on DRX configuration according to various embodiments of the present disclosure.

For example, a UE may perform full sensing in the entire active timer period. For example, a UE may perform partial sensing within an active timer period. Through this, the power saving gain can be maximized. In this case, for example, an active timer period can basically last for the duration of an OnDurationTimer interval. Additionally, for example, an active time period may be extended by adding an InactivityTimer period or a RetransmissionTimer period to an OnDurationTimer period according to a reception condition. For example, a UE may perform the full sensing only during an OnDuratonTimer period. For example, a UE may perform the full sensing during an OnDuratonTimer period extended by an InactivityTimer period (i.e., a basic OnDurationTimer period+InactivityTimer period). For example, a UE may perform the full sensing during an OnDuratonTimer interval extended by a Retransmission-Timer interval (i.e., a basic OnDurationTimer interval+RetransmissionTimer interval). For example, a UE may perform the full sensing during an OnDuratonTimer period extended by an InactivityTimer period and a RetransmissionTimer period (i.e., a basic OnDurationTimer period+InactivityTimer period+RetransmissionTimer period). For example, a UE may perform partial sensing for a time point apart by a specific time interval within an active timer period. For example, the specific time may be predefined for a UE. For example, the specific time may be configured or pre-configured for a UE by an upper layer. For example, a base station/network may transmit information related to the specific time to a UE.

For example, a selection window period for selecting/determining an actual transmission resource based on the channel sensing result may be determined within an active time of a DRX cycle that exists after an active time in which the channel sensing is performed. For example, a UE may determine a selection window period within an active time of a DRX cycle that exists after an active time for performing the channel sensing. For example, the sensing window may consist of active timer periods within a plurality of DRX cycles, and the selection window may consist of active timer periods within a plurality of DRX cycles. In this case, a UE may configure a sensing window by sequentially sliding over a plurality of active timer periods, and a UE may configure a selection window by sequentially sliding over a plurality of active timer periods. For example, the number of active timer periods used in the sensing window and the selection window may be configured equal to each other. For example, the number of active timer periods used for the sensing window and the selection window may be configured differently or independently. For example, the number of active timer periods used in the selection window may be configured so as not to exceed a packet delay budget (PDB) of packets to be transmitted by the UE.

For example, the length of active timer period(s) used for a sensing window and the length of active timer period(s) used for a selection window may match each other. In this case, based on the sensing results for slots apart by n slots from the start of each of the plurality of active timer periods within a sensing window, a UE may determine whether to select a resource for a slot apart by n slots from the start of an active timer period within an active timer period within a selection window. Here, for example, n may be a positive integer.

For example, when the PDB related to a packet to be transmitted by a UE is relatively large, and/or high transmission reliability is required for a packet to be transmitted by a UE, the UE may select or reselect a transmission resource within a time interval after a specific time point in which a resource collision probability is reduced by the continuous sensing among active timer periods within the selection window. For example, in the case of a relatively small PDB related to a packet to be transmitted by a UE and/or a packet requiring urgent transmission, the UE may select or reselect a transmission resource within a time interval prior to the specific time point among active timer periods within the selection window. For example, the specific time point may be predefined for a UE. For example, the specific time point may be configured or pre-configured for a UE by an upper layer. For example, a base station/network may transmit information related to the specific time point to a UE.

Figure 12:
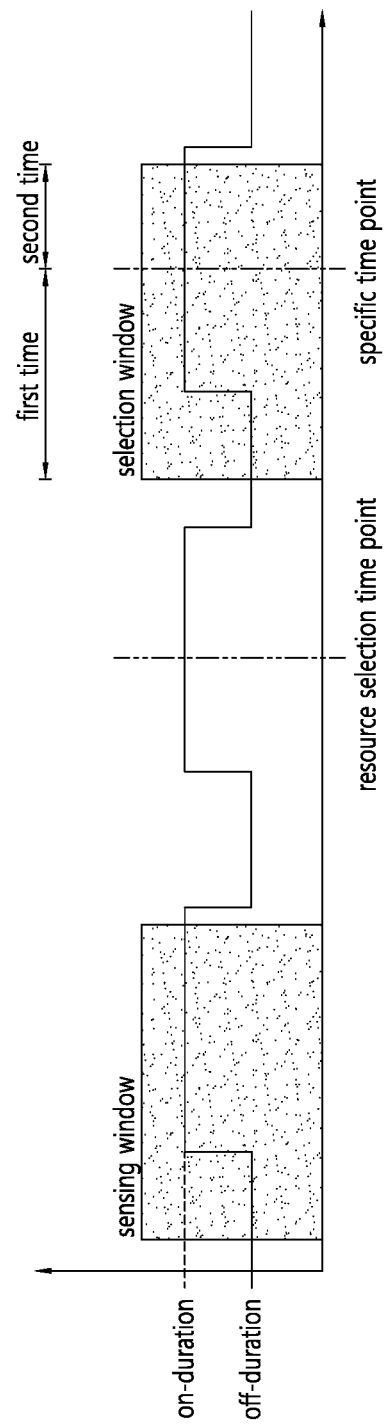
FIG. 12 shows a sensing window and a selection window according to an embodiment of the present disclosure.

FIG. 12 shows a sensing window and a selection window according to an embodiment of the present disclosure. The embodiment of FIG. 12 may be combined with various embodiments of the present disclosure.

Referring to FIG. 12, a sensing window and a selection window configured by a UE are shown. For example, the UE may repeatedly experience on-duration and off-duration times according to an SL DRX configuration. For example, according to various embodiments of the present disclosure, the on-duration may be extended to an active time. For example, according to various embodiments of the present disclosure, the off-duration may mean a time when a UE is not active. At a resource selection time point, a UE may select an SL resource to be used for transmitting SL data on the selection window based on a result of sensing performed in the sensing window. For example, the PDB related to the SL data may be higher than a threshold value. For example, the SL resource may be selected from resources in an on-duration period of a UE within the selection window. For example, the SL resource may be selected within a second time. The second time may represent a time after a specific time point during which the sensing window and the on-duration overlap. For example, the specific time point may be configured or pre-configured for the UE by a higher layer. For example, a base station/network may transmit information related to the specific time point to the UE.

For example, when the time of the transmission resource selected by a UE within an active timer period within a selection window is located after the start of the active timer period by a specific time interval, the UE may perform continuous sensing. Through this, prior to the final transmission, a probability that a transmission resource selected by a UE collides with a transmission resource selected by another UE may be minimized. In this case, a UE may perform the continuous sensing during the (selected resource time–specific time interval) from the start of the active timer period, and the UE may reselect the selected transmission resource based on the result of the continuous sensing. For example, the specific time interval may be predefined for a UE. For example, the specific time interval may be configured or pre-configured for a UE by an upper layer. For example, a base station/network may transmit information related to the specific time interval to a UE.

Figure 13:
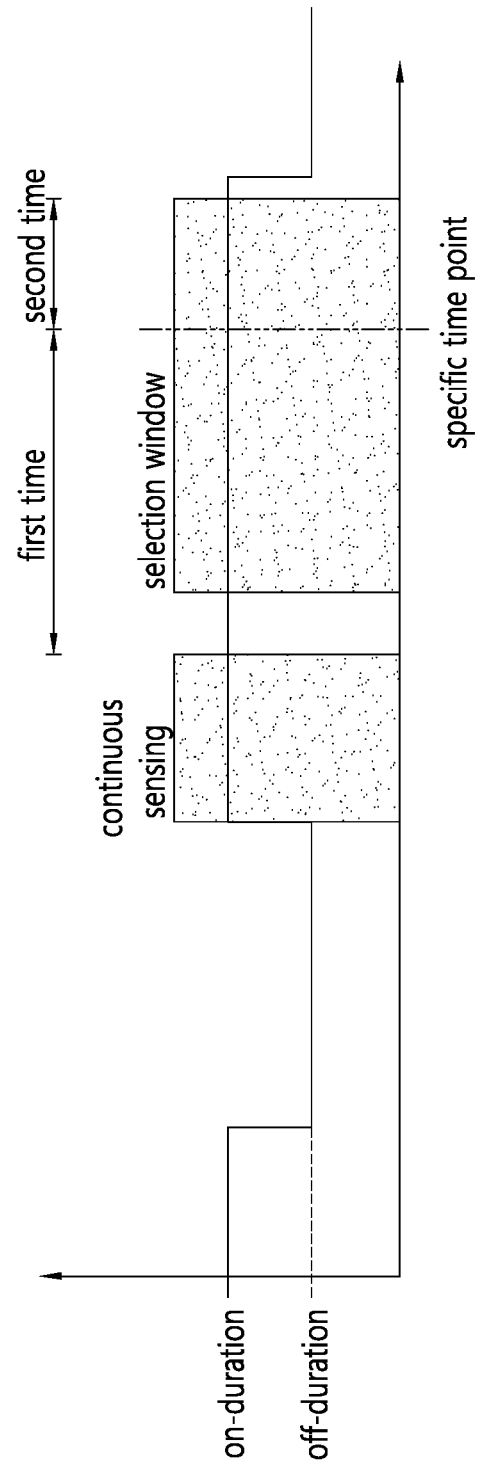
FIG. 13 shows a selection window in which a UE performs resource selection based on continuous sensing, according to an embodiment of the present disclosure.

FIG. 13 shows a selection window in which a UE performs resource selection based on continuous sensing, according to an embodiment of the present disclosure. The embodiment of FIG. 13 may be combined with various embodiments of the present disclosure.

Referring to FIG. 13, a selection window configured by a UE is shown. For example, the UE may repeatedly experience on-duration and off-duration times according to an SL DRX configuration. For example, according to various embodiments of the present disclosure, the on-duration may be extended to an active time. According to various embodiments of the present disclosure, the off-duration may mean a time when a UE is not in an active time. For example, the UE may perform continuous sensing from the start point of the on-duration. For example, the continuous sensing may be performed from a specific time point to a time point previous by a first time. For example, the UE may (re)select an SL resource within a second time period after the specific time point based on a result of the continuous sensing. For example, the first time may be predefined for a UE. For example, the first time may be configured or pre-configured for a UE by a higher layer. For example, a base station/network may transmit information related to the first time to a UE.

For example, for a packet with a very short delay requirement, a UE may perform channel sensing by configuring/determining an interval prior to a specific time point as a sensing window in an active timer period within one DRX cycle. In addition, a UE may perform resource selection based on the result of the channel sensing by configuring/determining an interval after the specific time point as a selection window in an active timer period within the one DRX cycle. For example, the specific time point may be predefined for a UE. For example, the specific time point may be configured or pre-configured for a UE by an upper layer. For example, a base station/network may transmit information related to the specific time point to a UE.

According to various embodiments of the present disclosure, in order to maximize a power saving gain of a DRX operating UE, a channel sensing and resource selection method performed by a mode 2 operating UE and a device supporting the same are proposed.

Figure 14:
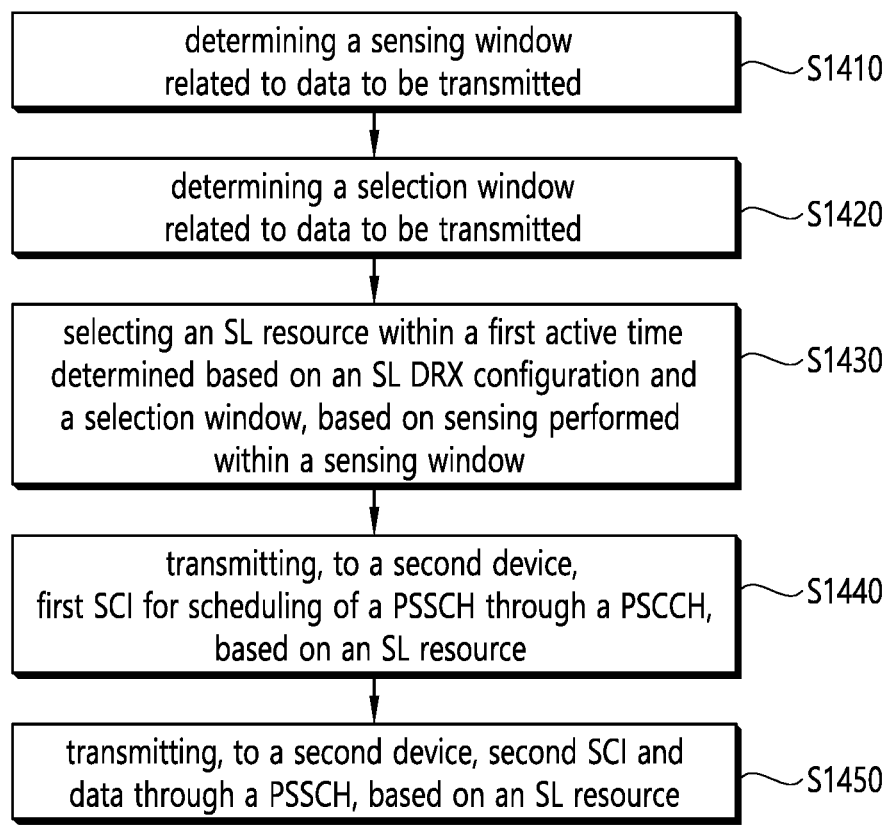
FIG. 14 shows a procedure for performing wireless communication by a first device according to an embodiment of the present disclosure.

FIG. 14 shows a procedure for performing wireless communication by a first device according to an embodiment of the present disclosure. The embodiment of FIG. 14 may be combined with various embodiments of the present disclosure.

Referring to FIG. 14, in step S1410, a first device may determine a sensing window related to data to be transmitted. In step S1420, the first device may determine a selection window related to the data to be transmitted. In step S1430, the first device may select a sidelink (SL) resource within a first active time determined based on an SL discontinuous reception (DRX) configuration and the selection window, based on sensing performed within the sensing window. In step S1440, the first device may transmit, to a second device, first sidelink control information (SCI) for scheduling of a physical sidelink shard channel (PSSCH) through a physical sidelink control channel (PSCCH), based on the SL resource. In step S1450, the first device may transmit, to the second device, second SCI and the data through the PSSCH, based on the SL resource. For example, the SL resource may be a resource being after a specific time point within the first active time and the selection window, based on the data with packet delay budget (PDB) greater than or equal to a threshold, and wherein the SL DRX configuration may be configured to the first device.

For example, the SL resource may be a resource being before the specific time point within the selection window, based on the PDB being less than the threshold.

For example, the specific time point may be a time point being after a start time point of the first active time by a specific time.

For example, the specific time point may be a time point after a time point, in which an overlap of the first active time and the selection window starts, by a specific time.

For example, the sensing window may include an entire second active time being before the first active time.

For example, additionally, the first device may receive, from a base station, information related to the specific time point.

For example, the sensing window may be determined within the first active time and a second active time being before the first active time.

For example, the start time point of the selection window may be the specific time point, the sensing window may overlap the first active time, and an end time point of the sensing window may be a time point being before the specific time point.

For example, additionally, the first device may perform continuous sensing within the first active time; and perform reselection for the SL resource based on a result of the continuous sensing.

For example, the continuous sensing may be performed from a start time point of the first active time.

For example, the continuous sensing may be performed from the start time point of the first active time, until a time point being before a time point corresponding to the SL resource by a specific time.

For example, a length of a second active time being before the first active time within the sensing window and a length of the first active time within the selection window may be the same.

For example, the SL resource may be selected based on a sensing result for a resource being apart from a start time point of the second active time within the sensing window, by a time interval between a start time point of the first active time and the SL resource.

The above-described embodiment may be applied to various devices described below. For example, a processor 102 of a first device 100 may determine a sensing window related to data to be transmitted. And, the processor 102 of the first device 100 may determine a selection window related to the data to be transmitted. And, the processor 102 of the first device 100 may select a sidelink (SL) resource within a first active time determined based on an SL discontinuous reception (DRX) configuration and the selection window, based on sensing performed within the sensing window. And, the processor 102 of the first device 100 may control a transceiver 106 to transmit, to a second device 200, first sidelink control information (SCI) for scheduling of a physical sidelink shard channel (PSSCH) through a physical sidelink control channel (PSCCH), based on the SL resource. And, the processor 102 of the first device 100 may control the transceiver 106 to transmit, to the second device 200, second SCI and the data through the PSSCH, based on the SL resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: determine a sensing window related to data to be transmitted; determine a selection window related to the data to be transmitted; select a sidelink (SL) resource within a first active time determined based on an SL discontinuous reception (DRX) configuration and the selection window, based on sensing performed within the sensing window; transmit, to a second device, first sidelink control information (SCI) for scheduling of a physical sidelink shard channel (PSSCH) through a physical sidelink control channel (PSCCH), based on the SL resource; and transmit, to the second device, second SCI and the data through the PSSCH, based on the SL resource, wherein the SL resource may be a resource being after a specific time point within the first active time and the selection window, based on the data with packet delay budget (PDB) greater than or equal to a threshold, and wherein the SL DRX configuration may be configured to the first device.

According to an embodiment of the present disclosure, a device configured to control a first user equipment (UE) may be proposed. For example, the device may comprise: one or more processors; and one or more memories operably connectable to the one or more processors and storing instructions, wherein the one or more processors may execute the instructions to: determine a sensing window related to data to be transmitted; determine a selection window related to the data to be transmitted; select a sidelink (SL) resource within a first active time determined based on an SL discontinuous reception (DRX) configuration and the selection window, based on sensing performed within the sensing window; transmit, to a second UE, first sidelink control information (SCI) for scheduling of a physical sidelink shard channel (PSSCH) through a physical sidelink control channel (PSCCH), based on the SL resource; and transmit, to the second UE, second SCI and the data through the PSSCH, based on the SL resource, wherein the SL resource ma be a resource being after a specific time point within the first active time and the selection window, based on the data with packet delay budget (PDB) greater than or equal to a threshold, and wherein the SL DRX configuration may be configured to the first UE.

According to an embodiment of the present disclosure, a non-transitory computer-readable storage medium storing instructions. For example, the instructions, when executed, may cause a first device to: determine a sensing window related to data to be transmitted; determine a selection window related to the data to be transmitted; select a sidelink (SL) resource within a first active time determined based on an SL discontinuous reception (DRX) configuration and the selection window, based on sensing performed within the sensing window; transmit, to a second device, first sidelink control information (SCI) for scheduling of a physical sidelink shard channel (PSSCH) through a physical sidelink control channel (PSCCH), based on the SL resource; and transmit, to the second device, second SCI and the data through the PSSCH, based on the SL resource, wherein the SL resource may be a resource being after a specific time point within the first active time and the selection window, based on the data with packet delay budget (PDB) greater than or equal to a threshold, and wherein the SL DRX configuration may be configured to the first device.

Figure 15:
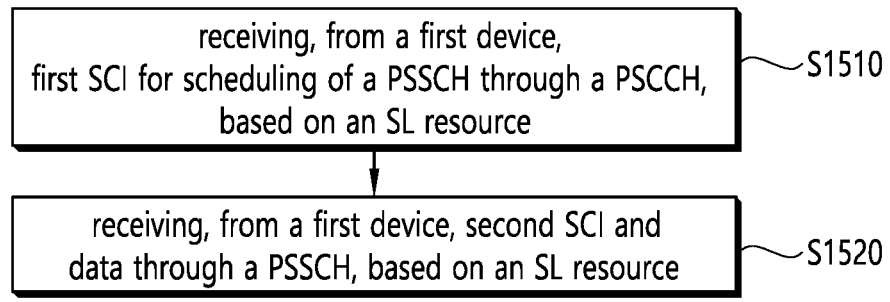
FIG. 15 shows a procedure for a second device to perform wireless communication according to an embodiment of the present disclosure.

FIG. 15 shows a procedure for performing wireless communication by a second device according to an embodiment of the present disclosure. The embodiment of FIG. 15 may be combined with various embodiments of the present disclosure.

Referring to FIG. 15, in step S1510, a second device may receive, from a first device, first sidelink control information (SCI) for scheduling of a physical sidelink shard channel (PSSCH) through a physical sidelink control channel (PSCCH), based on a sidelink (SL) resource. In step S1520, the second device may receive, from the first device, second SCI and data through the PSSCH, based on the SL resource. For example, the SL resource may be selected within a first active time determined based on an SL discontinuous reception (DRX) configuration and a selection window, based on sensing performed within a sensing window, the SL resource may be a resource being after a specific time point within the first active time and the selection window, based on the data with packet delay budget (PDB) greater than or equal to a threshold, and the SL DRX configuration may be configured to the first device.

For example, a length of a second active time being before the first active time within the sensing window and a length of the first active time within the selection window may be the same, and the SL resource may be selected based on a sensing result from a start time point of the second active time within the sensing window, by a time interval between a start time point of the first active time and the SL resource.

The above-described embodiment may be applied to various devices described below. For example, a processor 202 of a second device 200 may control a transceiver 206 to receive, from a first device 100, first sidelink control information (SCI) for scheduling of a physical sidelink shard channel (PSSCH) through a physical sidelink control channel (PSCCH), based on a sidelink (SL) resource. And, the processor 202 of the second device 200 may control the transceiver 206 to receive, from the first device 100, second SCI and data through the PSSCH, based on the SL resource.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, first sidelink control information (SCI) for scheduling of a physical sidelink shard channel (PSSCH) through a physical sidelink control channel (PSCCH), based on a sidelink (SL) resource; and receive, from the first device, second SCI and data through the PSSCH, based on the SL resource, wherein the SL resource may be selected within a first active time determined based on an SL discontinuous reception (DRX) configuration and a selection window, based on sensing performed within a sensing window, wherein the SL resource may be a resource being after a specific time point within the first active time and the selection window, based on the data with packet delay budget (PDB) greater than or equal to a threshold, and wherein the SL DRX configuration may be configured to the first device.

For example, a length of a second active time being before the first active time within the sensing window and a length of the first active time within the selection window may be the same, and the SL resource may be selected based on a sensing result from a start time point of the second active time within the sensing window, by a time interval between a start time point of the first active time and the SL resource.

When the PDB related to data to be transmitted through SL communication is relatively large and/or high transmission reliability is required for the data, when resource selection is performed like normal data, there is a problem of high possibility that the transmission reliability is not satisfied. Through the method described in the present disclosure, by determining a selection window that can satisfy the PDB, and selecting a resource after a specific time point in an active time within the selection window (i.e., for example, a (relatively) later resource), a UE may select a resource further reflecting the result of continuous sensing, and thus, the required transmission reliability may be satisfied.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., between devices).

Hereinafter, a description will be given in more detail with reference to the drawings. In the following drawings/description, the same reference symbols may denote the same or corresponding hardware blocks, software blocks, or functional blocks unless described otherwise.

Figure 16:
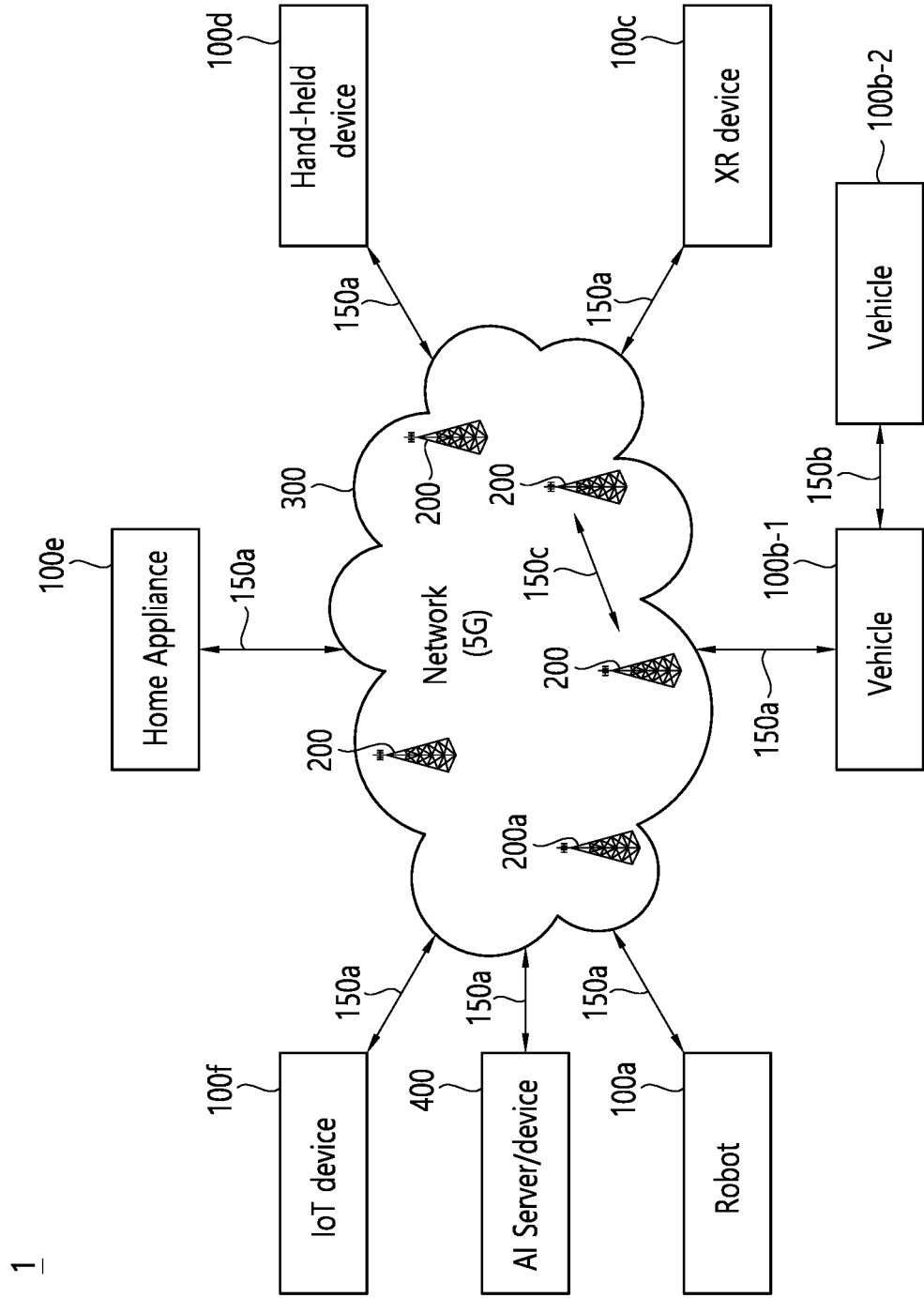
FIG. 16 shows a communication system 1, based on an embodiment of the present disclosure.

FIG. 16 shows a communication system 1, based on an embodiment of the present disclosure. The embodiment of FIG. 16 may be combined with various embodiments of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
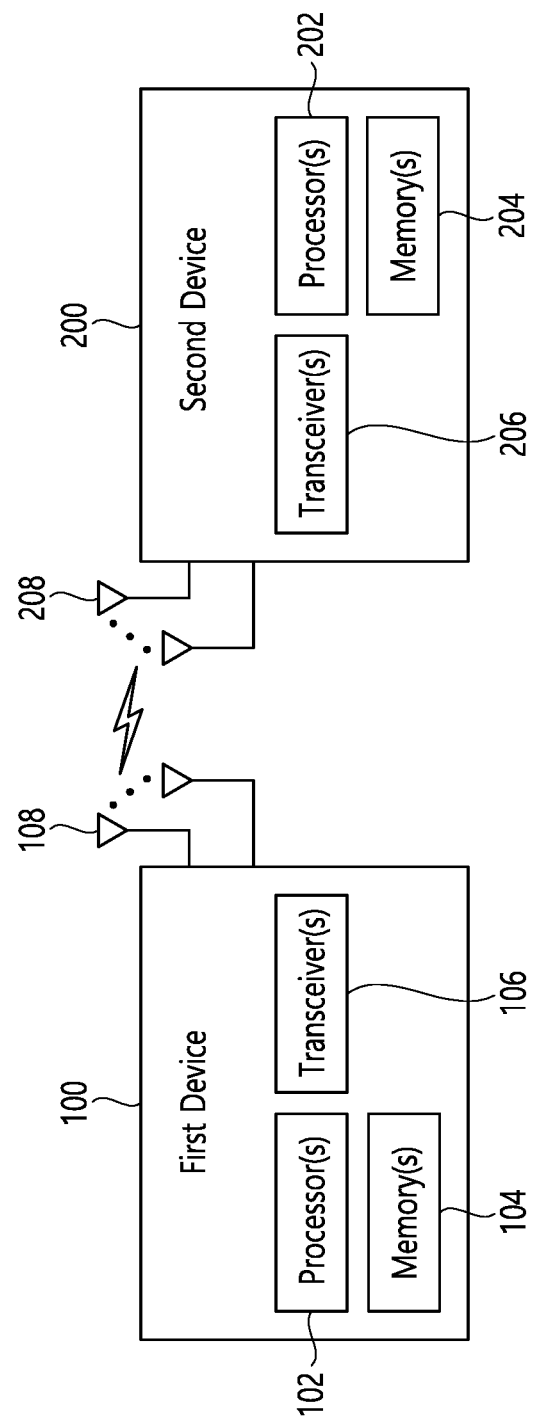
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
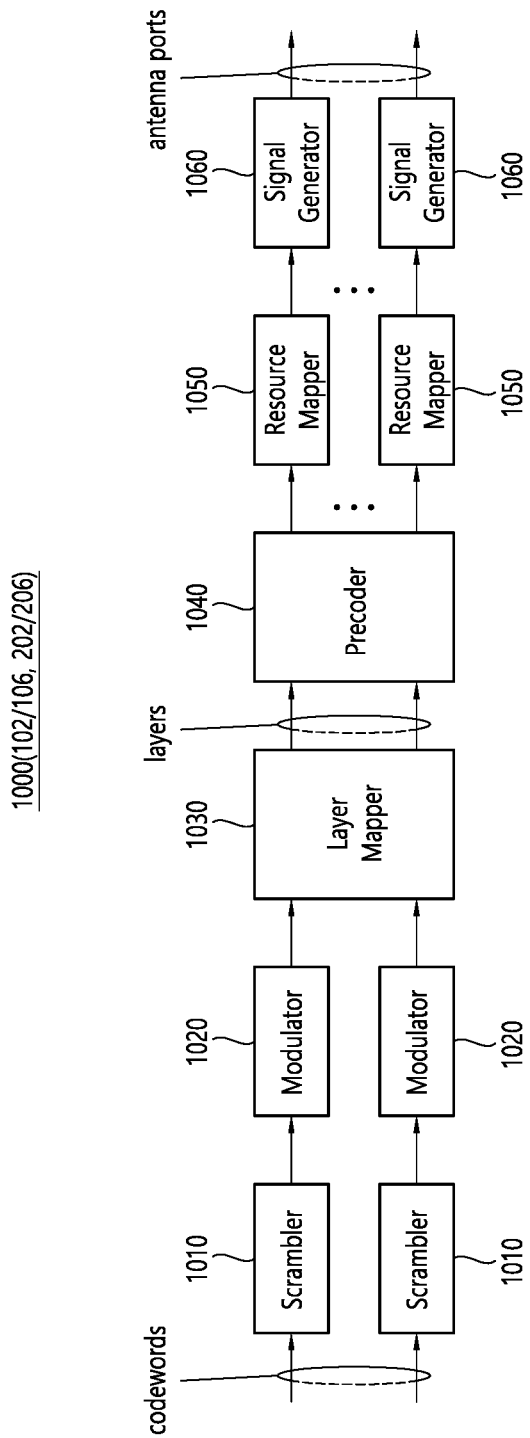
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
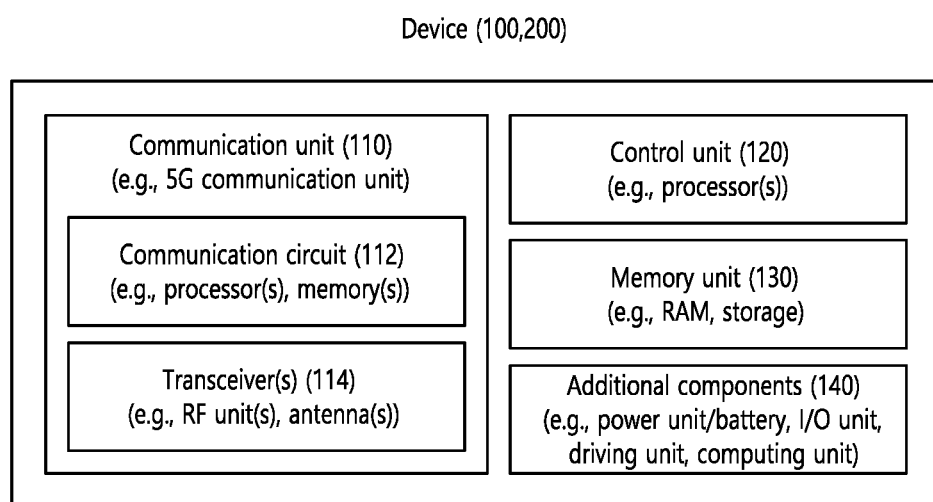
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast UE, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
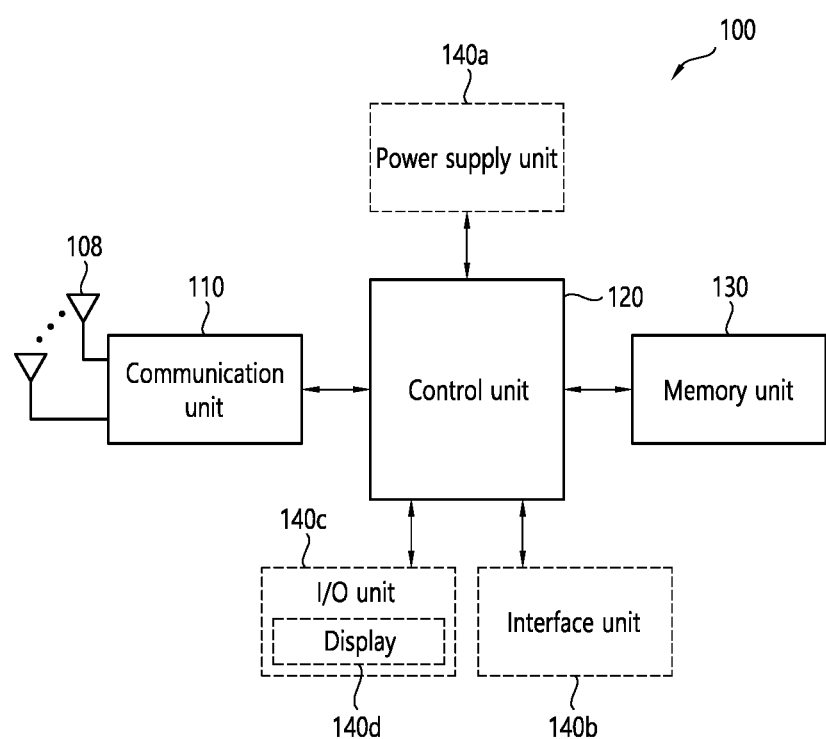
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
   determining a sensing window related to data to be transmitted;
   determining a selection window related to the data to be transmitted;
   selecting a sidelink (SL) resource within a first active time determined based on an SL discontinuous reception (DRX) configuration and the selection window, based on sensing performed within the sensing window;
   transmitting, to a second device, first sidelink control information (SCI) for scheduling of a physical sidelink shard channel (PSSCH) through a physical sidelink control channel (PSCCH), based on the SL resource; and
   transmitting, to the second device, second SCI and the data through the PSSCH, based on the SL resource,
   wherein the SL resource is a resource being after a specific time point within the first active time and the selection window, based on the data with packet delay budget (PDB) greater than or equal to a threshold, and
   wherein the SL DRX configuration is configured to the first device.

2. The method of claim 1, wherein the SL resource is a resource being before the specific time point within the selection window, based on the PDB being less than the threshold.

3. The method of claim 1, wherein the specific time point is a time point being after a start time point of the first active time by a specific time.

4. The method of claim 1, wherein the specific time point is a time point after a time point, in which an overlap of the first active time and the selection window starts, by a specific time.

5. The method of claim 1, wherein the sensing window includes an entire second active time being before the first active time.

6. The method of claim 1, further comprising:
   receiving, from a base station, information related to the specific time point.

7. The method of claim 1, wherein the sensing window is determined within the first active time and a second active time being before the first active time.

8. The method of claim 7, wherein the start time point of the selection window is the specific time point,
wherein the sensing window overlaps the first active time, and
wherein an end time point of the sensing window is a time point being before the specific time point.

9. The method of claim 1, further comprising
performing continuous sensing within the first active time; and
performing reselection for the SL resource based on a result of the continuous sensing.

10. The method of claim 9, wherein the continuous sensing is performed from a start time point of the first active time.

11. The method of claim 10, wherein the continuous sensing is performed from the start time point of the first active time, until a time point being before a time point corresponding to the SL resource by a specific time.

12. The method of claim 1, wherein a length of a second active time being before the first active time within the sensing window and a length of the first active time within the selection window is the same.

13. The method of claim 12, wherein the SL resource is selected based on a sensing result for a resource being apart from a start time point of the second active time within the sensing window, by a time interval between a start time point of the first active time and the SL resource.

14. A first device for performing wireless communication, the first device comprising:
one or more memories storing instructions;
one or more transceivers; and
one or more processors connected to the one or more memories and the one or more transceivers, wherein the one or more processors execute the instructions to:
determine a sensing window related to data to be transmitted;
determine a selection window related to the data to be transmitted;
select a sidelink (SL) resource within a first active time determined based on an SL discontinuous reception (DRX) configuration and the selection window, based on sensing performed within the sensing window;
transmit, to a second device, first sidelink control information (SCI) for scheduling of a physical sidelink shard channel (PSSCH) through a physical sidelink control channel (PSCCH), based on the SL resource; and
transmit, to the second device, second SCI and the data through the PSSCH, based on the SL resource,
wherein the SL resource is a resource being after a specific time point within the first active time and the selection window, based on the data with packet delay budget (PDB) greater than or equal to a threshold, and
wherein the SL DRX configuration is configured to the first device.

15. A device configured to control a first user equipment (UE), the device comprising:
one or more processors; and
one or more memories operably connectable to the one or more processors and storing instructions, wherein the one or more processors execute the instructions to:
determine a sensing window related to data to be transmitted;
determine a selection window related to the data to be transmitted;
select a sidelink (SL) resource within a first active time determined based on an SL discontinuous reception (DRX) configuration and the selection window, based on sensing performed within the sensing window;
transmit, to a second UE, first sidelink control information (SCI) for scheduling of a physical sidelink shard channel (PSSCH) through a physical sidelink control channel (PSCCH), based on the SL resource; and
transmit, to the second UE, second SCI and the data through the PSSCH, based on the SL resource,
wherein the SL resource is a resource being after a specific time point within the first active time and the selection window, based on the data with packet delay budget (PDB) greater than or equal to a threshold, and
wherein the SL DRX configuration is configured to the first UE.

* * * * *